United States Patent
Sanji et al.

(10) Patent No.: US 8,970,084 B2
(45) Date of Patent: Mar. 3, 2015

(54) STATOR CORE OF ROTATING ELECTRICAL MACHINE WITH ALTERNATELY LAMINATED CORE PLATES

(75) Inventors: Hiroaki Sanji, Takahama (JP); Yasuo Yamaguchi, Kariya (JP); Yuya Honda, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 429 days.

(21) Appl. No.: 13/315,839

(22) Filed: Dec. 9, 2011

(65) Prior Publication Data

US 2012/0153768 A1    Jun. 21, 2012

(30) Foreign Application Priority Data

Dec. 17, 2010   (JP) .................................. 2010-282382

(51) Int. Cl.
*H02K 1/18*   (2006.01)
*H02K 1/16*   (2006.01)
*H02K 15/02*   (2006.01)

(52) U.S. Cl.
CPC ............... *H02K 15/024* (2013.01); *H02K 1/16* (2013.01)
USPC .................................................. 310/216.009

(58) Field of Classification Search
CPC ......... H02K 1/18; H02K 1/141; H02K 1/143; H02K 2213/03; H02K 15/02; H02K 15/022; H02K 15/024; H02K 15/026; H02K 15/028
USPC ...................................... 310/216.009, 216.008
See application file for complete search history.

(56) References Cited

U.S. PATENT DOCUMENTS

| 5,256,926 A * | 10/1993 | Hagenlocher et al. .. 310/216.009 |
| 2006/0279160 A1* | 12/2006 | Yoshinaga et al. ............. 310/216 |
| 2013/0002086 A1* | 1/2013 | Kaiser et al. ........... 310/216.009 |

FOREIGN PATENT DOCUMENTS

| JP | A-2003-199302 | 7/2003 |
| JP | A-2006-288096 | 10/2006 |
| JP | A-2007-20386 | 1/2007 |
| JP | A-2007-49859 | 2/2007 |

OTHER PUBLICATIONS

Dec. 27, 2011 International Search Report issued in International Patent Application No. PCT/JP2011/077555 (with translation).

* cited by examiner

*Primary Examiner* — Michael Andrews
(74) *Attorney, Agent, or Firm* — Oliff PLC

(57) ABSTRACT

A stator core of a rotating electrical machine includes an annular first core plate including a plurality of first core plate pieces and an annular second core plate including a plurality of second core plate pieces. A predetermined number of the first and second core plates are alternately laminated such that stator fixing portions overlap with each other and such that positions of joints between the first core plate pieces of the first core plates differ from positions of joints between the second core plate pieces of the second core plates in the circumferential direction.

2 Claims, 7 Drawing Sheets

STATOR CORE OF ROTATING ELECTRICAL MACHINE WITH ALTERNATELY LAMINATED CORE PLATES

INCORPORATION BY REFERENCE

The disclosure of Japanese Patent Application No. 2010-282382 filed on Dec. 17, 2010 including the specification, drawings and abstract is incorporated herein by reference in its entirety.

BACKGROUND OF THE INVENTION

The present invention relates to stator cores of rotating electrical machines formed of laminates of a plurality of core plates, and more specifically, relates to the structures of the laminates.

DESCRIPTION OF THE RELATED ART

It is known that typical stator cores of rotating electrical machines are formed by laminating a plurality of annular core plates. To date, among these stator cores (separable motor cores), those including a plurality of separate pieces that form a stator core when assembled in an annular manner, the separate pieces each structured by laminating core plate pieces into which the core plates are divided, have been devised (see Japanese Patent Application Publication No. JP-A-2003-199302).

SUMMARY OF THE INVENTION

When a stator core is structured by assembling a plurality of separate pieces as described in Japanese Patent Application Publication No. JP-A-2003-199302, however, positions (phases) of dividing points (joints) of the core plate pieces in the circumferential direction are the same in all the core plate layers, and this prevents the ring strength of the stator core from increasing.

In addition, the stator core described in JP-A-2003-199302 is structured by separate pieces having stator fixing portions, used to fix the stator to a stator holding member, on the outer circumferences thereof and separate pieces without the stator fixing portions, and the separate pieces without the stator fixing portions are supported only by the separate pieces with the stator fixing portions. This also prevents the ring strength of the stator core from increasing.

Accordingly, it is an object of the present invention to provide a stator core of a rotating electrical machine including first core plates and second core plates laminated such that stator fixing portions thereof overlap with each other, the first core plates including first core plate pieces each having the stator fixing portion at a position closer to a first end than to the midpoint and the second core plates including second core plate pieces each having the stator fixing portion at a position closer to a second end than to the midpoint, and thereby capable of solving the above-described problems.

According to a first aspect of the present invention, a stator core of a rotating electrical machine includes: an annular first core plate including a plurality of first core plate pieces, each of which is an arc-shaped member and has a stator fixing portion that is fixed to a stator holding member and protrudes from an outer circumference of the arc-shaped member at a position closer to a first side than to a midpoint of the outer circumference in a circumferential direction, the plurality of first core plate pieces being disposed in the circumferential direction to form the annular shape of the first core plate; and an annular second core plate including a plurality of second core plate pieces, each of which is an arc-shaped member and has a stator fixing portion that is fixed to the stator holding member and protrudes from an outer circumference of the arc-shaped member at a position closer to a second side than to a midpoint of the outer circumference in the circumferential direction, the plurality of second core plate pieces being disposed in the circumferential direction to form the annular shape of the second core plate. In the stator core, a predetermined number of the first and second core plates are alternately laminated such that the stator fixing portions overlap with each other and such that positions of joints between the first core plate pieces of the first core plates differ from positions of joints between the second core plate pieces of the second core plates in the circumferential direction.

According to the first aspect, the stator core is structured by laminating the first core plates, including the first core plate pieces each having the stator fixing portion formed at a position closer to the first side than to the midpoint of the core plate piece, and the second core plates, including the second core plate pieces each having the stator fixing portion formed at a position closer to the second side than to the midpoint of the core plate piece, such that the stator fixing portions overlap with each other. As a result, the positions of the joints between the core plate pieces of the first core plates can be made different from those of the joints between the core plate pieces of the second core plates in the circumferential direction, and this can lead to an increase in the ring strength of the stator core. In addition, since the stator fixing portions of the first core plate pieces are formed at positions closer to the first sides than to the midpoints of the core plate pieces and the stator fixing portions of the second core plate pieces are formed at positions closer to the second sides than to the midpoints of the core plate pieces, the stator fixing portions to be fixed to the stator holding member can be disposed close to the joint surfaces of the core plate pieces, and this can lead to a further increase in the ring strength of the stator core.

According to a second aspect of the present invention, the first and second core plates may be structured by joining the plurality of first and second core plate pieces at the joint surfaces at both ends thereof in the circumferential direction, and when the plurality of first and second core plate pieces are punched out of a base material by pressing with the outer circumference of one of the plurality of first and second core plate pieces disposed close to an inner circumference of another one of the plurality of first and second core plate pieces, the stator fixing portion of the one core plate piece may be located at a space between the outer circumference of the one core plate piece and the joint surface of the other core plate piece.

According to the second aspect, the stator fixing portion of the core plate piece is formed in a dead space when the core plate pieces are punched out of the base material, that is, in the space between the outer circumference of the one core plate piece and the joint surface of the other core plate piece adjacent to the one core plate piece. As a result, the pitch between the core plate pieces to be punched out of the base material can be reduced, and this can lead to an increase in the yield.

According to a third aspect of the present invention, the first and second core plates may be structured by joining the plurality of first and second core plate pieces at the joint surfaces at both ends thereof in the circumferential direction, the stator fixing portion of each of the first core plate pieces may be formed on the outer circumference on an opposite side of a parallel line from a perpendicular line orthogonal to a tangent at the midpoint, the parallel line being parallel to the perpendicular line and passing through a corner of the joint surface on an inner circumferential side of the first core plate piece, and the stator fixing portion of each of the second core plate pieces be formed on the outer circumference on an opposite side of a parallel line from a perpendicular line orthogonal to a tangent at the midpoint, the parallel line being parallel to the perpendicular line and passing through a corner of the joint surface on an inner circumferential side of the second core plate piece.

According to the third aspect, the stator fixing portion of each of the first and second core plate pieces is formed on the outer circumference of the core plate piece on an opposite side of the parallel line from the perpendicular line orthogonal to the tangent at the midpoint of the core plate piece in the circumferential direction, the parallel line being parallel to the perpendicular line and passing through the corner of the joint surface on the inner circumferential side of the core plate piece. As a result, the stator fixing portions are located in the dead spaces when the core plate pieces are punched out of the base material, and this can lead to an increase in the yield.

BRIEF DESCRIPTION OF THE DRAWINGS

[First Embodiment]

Figure 1:
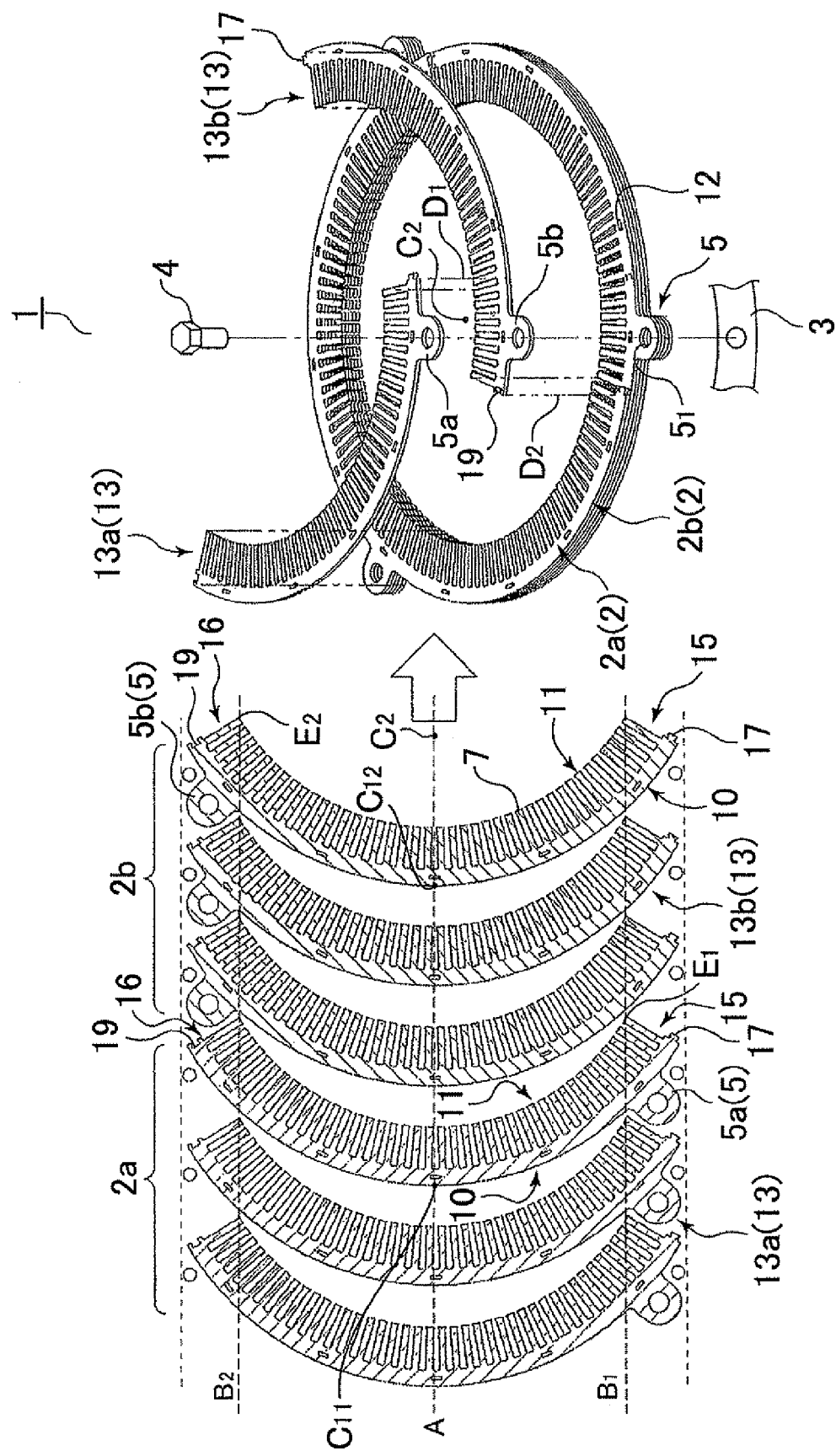
FIG. 1 is a schematic view of a stator core according to a first embodiment of the present invention.

A stator core of a rotating electrical machine according to an embodiment of the present invention will now be described with reference to the drawings. As shown in FIGS. 1 and 2, a stator core 1 of an IPM motor (rotating electrical machine) is formed by laminating a plurality of annular core plates 2 serving as tabular members punched out of a base material of a magnetic steel sheet. A plurality of (three in this embodiment) stator fixing portions 5 to be fixed to a stator holding member 3 such as a transmission case protrude outward from the outer circumference 10 of each core plate 2 in a radial direction of each core plate 2. The inner circumferential surface 11 of each core plate 2 is comb-shaped, and coils can be wound around stator teeth 7 extending from an annular yoke portion 6, on which the stator fixing portions 5 are formed, toward the inside diameter of the core plate.

A plurality of fastening portions 12 used to fasten the laminated core plates to each other are formed in the yoke portion 6 in the circumferential direction. The fastening portions 12 each include a protrusion (dowel) protruding from one side of the core plate 2 formed by press forming and a recess formed as a result of the formation of the protrusion at the same position on the other side of the core plate 2. The stator core 1 can retain the shape without the core plates 2 falling apart since the protrusions of the fastening portions 12 are connected to the recesses of the fastening portions 12 of the core plates 2 in the other layers by dowel fastening while the protrusions are engaged with the recesses.

In order to increase the yield of the core plates 2, the core plates 2 are evenly divided (trisection in this embodiment) into arc-shaped core plate pieces 13 when the core plates 2 are punched out of the base material of the magnetic steel sheet, and each core plate 2 in one layer is structured by connecting the core plate pieces 13 to each other.

Specifically, each of the core plate pieces 13 serving as arc-shaped members has the stator fixing portion 5 protruding from the outer circumference of the arc-shaped member so as to be fixed to the stator holding member 3, and has a projection 17 formed at a first end 15 of the core plate piece 13 in the circumferential direction so as to connect the core plate piece 13 to an adjacent core plate piece 13 in the circumferential direction of the core plate 2. In addition, the core plate piece 13 has a depression 19 at a second end 16 thereof in the circumferential direction, the projection 17 of the other core plate piece 13 being fitted into the depression 19. Therefore, each core plate 2 has the same number of joints $D_1$ or $D_2$ between the core plate pieces, that is, the same number of the joining points between the projections 17 and the depressions 19 as the core plate pieces 13, and the core plate 2 is divided into the same number of the core plate pieces 13 as the stator fixing portions 5.

Figure 2A:
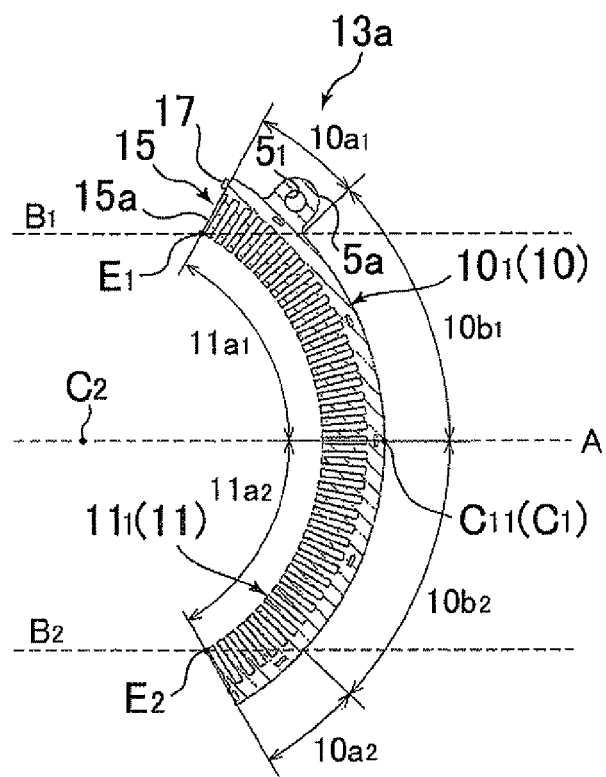
FIG. 2A is a schematic view of a first core plate piece according to the first embodiment of the present invention.
Figure 2B:
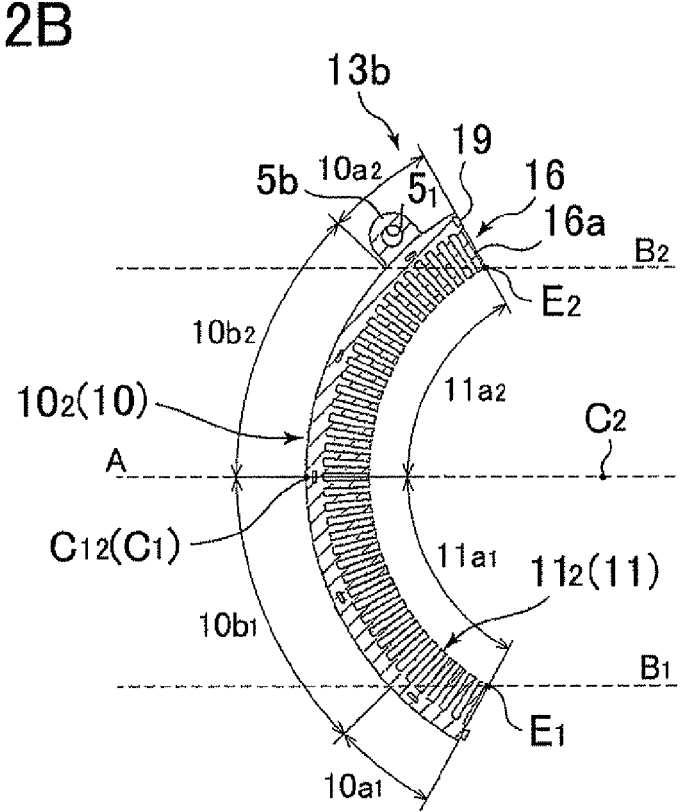
FIG. 2B is a schematic view of a second core plate piece according to the first embodiment of the present invention.

In other words, each core plate piece 13 has the projection 17 and the depression 19 at joint surfaces 15a and 16a, respectively, at both ends of the core plate piece 13 in the circumferential direction, and the arc-shaped core plate pieces 13 are joined to each other at the joint surfaces 15a and 16a, thereby forming the core plate 2 in one layer (see also FIGS. 2A and 2B).

Herein, the core plate pieces 13 only need, to be brought into contact with each other at the joint surfaces 15a and 16a so as to form the annular core plate 2, and do not necessarily need to be connected to each other with the projections 17 and the depressions 19. That is, two core plate pieces 13 adjacent to each other in the circumferential direction may be disposed such that a core plate piece 13 in another layer extends across the joint $D_1$ or $D_2$ between the two core plate pieces 13, and may be connected to each other by the core plate piece 13 in the other layer connected to both the two core plate pieces 13 adjacent to each other in the circumferential direction by dowel fastening. In addition, the joints $D_1$ and $D_2$ are located between the stator teeth 7.

Next, the core plates 2 will be described in detail. The core plates 2 include two types of core plates 2a and 2b, that is, annular first core plates 2a each formed of a plurality of first core plate pieces (core plate pieces with the stator fixing portions located closer to first sides) 13a disposed in the circumferential direction to together form an annular shape and annular second core plates 2b each formed of a plurality of second core plate pieces (core plate pieces with the stator fixing portions located closer to second sides) 13b disposed in the circumferential direction to together form an annular shape, the installation positions of the stator fixing portions 5 of the second core plate pieces 13b differing from those of the stator fixing portions 5 of the first core plate pieces 13a. Each of the first core plate pieces 13a has a stator fixing portion 5a on the outer circumference $10_1$ (10) thereof at a position closer to the first end (first side) 15 than to the midpoint $C_{11}$ in the circumferential direction, and more specifically, closer to the end 15 with the projection than to a virtual line A connecting the center $C_2$ of the stator core 1 and the midpoint $C_{11}$ between both ends 15 and 16 of the core plate piece 13.

Meanwhile, each of the second core plate pieces 13b has a stator fixing portion 5b at a position closer to the second end (second side) 16 than to the virtual line A, that is, on the outer circumference $10_2$ (10) thereof at a position closer to the end with the depression than to the midpoint $C_{12}$ in the circumferential direction. Since the stator core 1 is structured by alternately laminating the first core plates 2a and the second core plates 2b such that the stator fixing portions 5a and 5b, respectively, overlap with each other, the first core plates 2a being structured by connecting the first core plate pieces 13a having the stator fixing portions 5a closer to the first ends than to the virtual line A and the second core plates 2b being structured by connecting the second core plate pieces 13b having the stator fixing portions 5b closer to the second ends than to the virtual line A, the positions (phases) of the joints $D_1$ and $D_2$ between the core plate pieces 13a and 13b, respectively, in the circumferential direction are alternately shifted from each other with respect to the core plates 2a and 2b overlapping with (adjacent to) each other in the direction of lamination.

In other words, the stator core 1 is structured by laminating the first core plates 2a and the second core plates 2b such that the stator fixing portions thereof overlap with each other and such that the positions of the joints $D_1$ between the first core plate pieces of the first core plates 2a differ from those of the joints $D_2$ between the second core plate pieces of the second core plates 2b in the circumferential direction as if bricks are laid. Herein, the virtual line A is a perpendicular line orthogonal to tangents at the midpoints $C_{11}$ of the first core plate pieces 13a, and at the same time, a perpendicular line orthogonal to tangents at the midpoints $C_{12}$ of the second core plate pieces 13b.

Next, the first core plate pieces 13a and the second core plate pieces 13b will be described in detail. As shown in FIGS. 2A and 2B, each first core plate piece 13a has the stator fixing portion 5a at the end 15 of the core plate piece 13, and each second core plate piece 13b has the stator fixing portion 5b at the end 16 of the core plate piece 13. The position of the stator fixing portion 5b of the second core plate piece 13b is symmetric to that of the first core plate piece 13a with respect to the virtual line A.

More specifically, the stator fixing portion 5a of the first core plate piece 13a is formed on an outer circumference (end-side outer circumference) $10a_1$ of the core plate piece 13 on an opposite side of a parallel line $B_1$ from the virtual line A, the parallel line $B_1$ being parallel to the virtual line A and passing through a corner $E_1$ of the joint surface 15a on the inner circumferential side, the joint surfaces 15a and 16a connecting the outer circumferences 10 and the inner circumferences 11 of the core plate pieces 13; and the stator fixing portion 5b of the second core plate piece 13b is formed on an outer circumference (end-side outer circumference) $10a_2$ of the core plate piece 13 on an opposite side of a parallel line $B_2$ from the virtual line A, the parallel line $B_2$ being parallel to the virtual line A and passing through a corner $E_2$ of the joint surface 16a on the inner circumferential side. That is, the first core plate piece 13a has the stator fixing portion 5a on the end-side outer circumference $10a_1$ that is on the side of the end with the projection, and the second core plate piece 13b has the stator fixing portion 5b on the end-side outer circumference $10a_2$ that is on the side of the end with the depression.

As a result, in the first core plate pieces 13a and the second core plate pieces 13b, the curvature of the outer circumference $10b_1$ from the midpoint $C_1$ ($C_{11}$) of the core plate piece 13a to the stator fixing portion 5a is smaller than that of an inner circumference $11a_1$ from the midpoint $C_1$ of the core plate piece 13a to the joint surface 15a at the end 15 on the side where the stator fixing portion 5a is provided, and the curvature of the outer circumference $10b_2$ from the midpoint $C_1$ ($C_{12}$) of the core plate piece 13b to the stator fixing portion 5b is smaller than that of an inner circumference $11a_2$ from the midpoint $C_1$ of the core plate piece 13b to the joint surface 16a at the end 16 on the side where the stator fixing portion 5b is provided. That is, the inner circumferences $11a_1$ and $11a_2$ are longer than the outer circumferences $10b_1$ and $10b_2$, respectively, due to the larger curvature. However, when compared using perpendicular distances that are perpendicular to the virtual line A, the outer circumferences $10b_1$ and $10b_2$ are longer than the inner circumferences $11a_1$ and $11a_2$, respectively.

Therefore, as shown in FIG. 1, when the plurality of first core plate pieces 13a and the second core plate pieces 13b are disposed such that the outer circumferences 10 thereof and the inner circumferences 11 of the adjacent core plate pieces 13a and 13b are close to each other, the stator fixing portions 5a of the core plate pieces 13a on the inner circumferential side are located in spaces S between the outer circumferences 10 of the core plate pieces 13a on the inner circumferential side and the joint surfaces 15a at the ends 15 of the core plate pieces 13a and 13b on the outer circumferential side, and the stator fixing portions 5b of the core plate pieces 13b on the inner circumferential side are located in spaces S between the outer circumferences 10 of the core plate pieces 13b on the inner circumferential side and the joint surfaces 16a at the ends 16 of the core plate pieces 13a and 13b on the outer circumferential side.

In other words, when the plurality of first core plate pieces 13a and the second core plate pieces 13b are punched out of the base material by pressing while the outer circumference 10 of one of the core plate pieces 13a and 13b and the inner circumference 11 of the other core plate piece 13a or 13b are close to each other, the stator fixing portion 5a of the core plate piece 13a is located in the space S between the outer circumference 10 of the core plate piece 13a and the joint surface 15a of the other core plate piece 13a or 13b, or the stator fixing portion 5b of the core plate piece 13b is located in the space S between the outer circumference 10 of the core plate piece 13b and the joint surface 16a of the other core plate piece 13a or 13b.

Figure 3A:
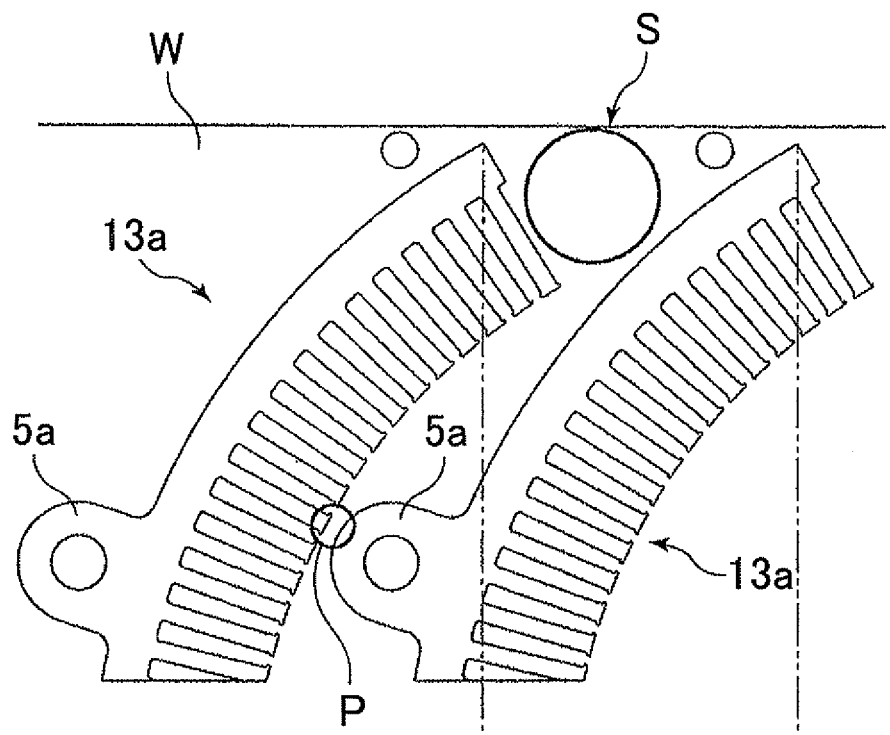
FIG. 3A is a schematic view, when the core plate pieces are punched out of a base material, illustrating a pitch between core plate pieces whose stator fixing portions are not formed at ends thereof.
Figure 3B:
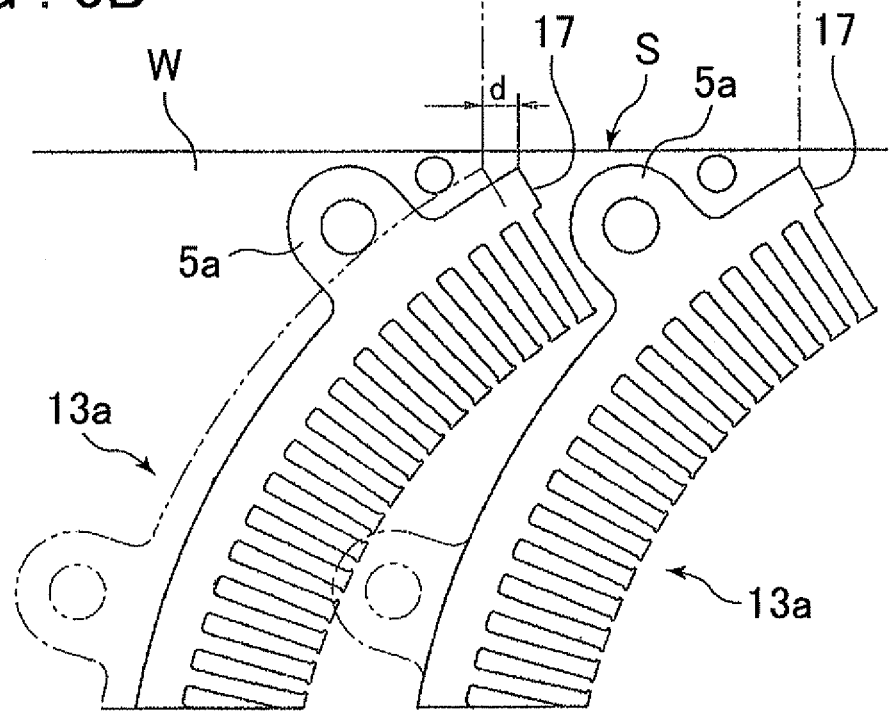
FIG. 3B is a schematic view, when the core plate pieces are punched out of a base material, illustrating a pitch between core plate pieces whose stator fixing portions are formed at ends thereof.

That is, as shown in FIGS. 3A and 3B, when the first core plate pieces 13a and the second core plate pieces 13b are punched out of a base material W by pressing, the stator fixing portion 5a of each first core plate piece 13a or the stator fixing portion 5h of each second core plate piece 13b is located in the dead space S between the outer circumference 10 of the first core plate piece 13a or the second core plate piece 13b (one core plate piece) on the inner circumferential side and the end 15 or 16, respectively, of the first core plate piece 13a or the second core plate piece 13b (the other core plate piece) on the outer circumferential side, and thereby a pitch P between the core plate pieces to be punched out, the pitch having been determined by the gap between the stator fixing portion 5 and the inner circumference 11 of the adjacent core plate piece, can be reduced compared with the case where the stator fixing portions 5a and 5b are located close to the midpoints $C_1$ of the core plate pieces 13.

Herein, the concept of the ends 15 and 16 is broader than the joint surfaces 15a and 16a including the installation positions of the stator fixing portions 5, and the joint surfaces 15a and 16a refer to the entire surfaces including the uneven portions of the projections 17 and the depressions 19, respectively, extending in radial directions.

Next, effects of the stator core 1 according to the embodiment of the present invention will be described. When an operator produces the stator core 1, first, the operator punches the first core plate pieces 13a and the second core plate pieces 13b out of a base material of a magnetic steel sheet while the outer circumference and the inner circumference of two adjacent core plate pieces are disposed close to each other so that the pitch P between the core plates is reduced as much as possible. The first core plate pieces 13a are disposed on a mother die (not shown) of a press machine in an annular manner so that a first core plate is structured, and the second core plate pieces 13b are disposed on the first core plate in an annular manner so that a second core plate 2b is laminated on the first core plate.

When the second core plate 2b structured by the second core plate pieces 13b is laminated on the first core plate 2a structured by the first core plate pieces 13a, the laminated first core plates 2a and the second core plates 2b are integrated with each other through dowel fastening by pressing. The stator core 1 is produced by the repetition of these steps. After the stator core 1 is formed, coils are wound around the stator teeth 7 so that a stator (not shown) is structured, and mounting bolts 4 are fitted into insertion holes $5_1$ of the stator fixing portions 5 so that the stator is attached to a transmission case 3. After the stator is attached to the transmission case 3, a rotor (not shown) is installed so that a rotating electrical machine is structured.

Herein, each of the stator fixing portions 5 has the insertion hole $5_1$ at the center thereof, and is a flange member having sides $5_2$ serving as a pair of parallel surfaces. Since the first core plate pieces 13a and the second core plate pieces 13b are disposed in an annular manner such that the sides $5_2$ of the stator fixing portions 5 are fitted in rails of the mother die, the core plates 2 are laminated without being shifted in the circumferential direction and in the direction of lamination.

In the stator core 1 having the above-described structure, the first core plates 2a structured by connecting the first core plate pieces 13a having the stator fixing portions 5a formed at positions that are displaced to be closer to the first ends 15 than to the midpoints $C_{11}$ and the second core plates 2b structured by connecting the second core plate pieces 13b having the stator fixing portions 5b formed at positions that are displaced to be closer to the second ends 16 than to the midpoints $C_{12}$ of the core plate pieces 13b are laminated on each other such that the phases of the joints $D_1$ between the core plate pieces 13a differ from those of the joints $D_2$ between the core plate pieces 13b. This results in an increase in the ring strength of the stator core 1.

Figure 4:
FIG. 4 illustrates a relationship between the natural frequency of the stator core and a distance from a joint of a core plate to a stator fixing portion.

In addition, as is clear from the fact shown in FIG. 4 that the natural frequency of the stator core 1 increases as the joints $D_1$ and $D_2$ of the core plates 2 are close to the stator fixing portions 5, the ring strength of the stator core 1 can be further increased by the stator fixing portions 5a of the first core plate pieces 13a and the stator fixing portions 5b of the second core plate pieces 13b formed at positions as close to the joint surfaces 15a of the core plate pieces 13a and 13b and the joint surfaces 16a of the core plate pieces 13b and 13b, respectively, as possible such that the joints $D_1$ between the first core plates 2a and the joints $D_2$ between the second core plate 2b are located on both sides of the stator fixing portions 5 in the circumferential direction so as to have the stator fixing portions 5 interposed therebetween. In FIG. 4, the abscissa represents the angle from the stator fixing portions 5 of the core plates 2 to the joints $D_1$ and $D_2$, and the ordinate represents the natural frequency of the stator core 1. FIG. 4 shows that the ring strength of the stator core 1 becomes higher as the natural frequency becomes higher.

The ring strength of the stator core 1 is further increased since all the core plate pieces 13a and 13b are supported by the transmission case 3 with the stator fixing portions 5a formed on the outer circumferential surfaces $10_1$ of the first core plate pieces 13a and the stator fixing portions 5b formed on the outer circumferential surfaces $10_2$ of the second core plate pieces 13b, respectively.

Furthermore, the pitch P between the core plate pieces to be punched out can be reduced since the stator fixing portions 5 are formed in the dead spaces when the core plate pieces 13a and 13b are punched out of the base material, that is, in the spaces S between the outer circumferences 10 of the core plate pieces 13a and 13b and the joint surfaces 15a and 16a of the adjacent core plate pieces 13a and 13b. This leads to an increase in the yield.

[Second Embodiment]

Next, a second embodiment of the present invention will be described. The second embodiment differs from the first embodiment in that the first core plates 2a and the second core plates 2b are unevenly divided, and the description of the same structure as the first embodiment will be omitted.

Figure 5:
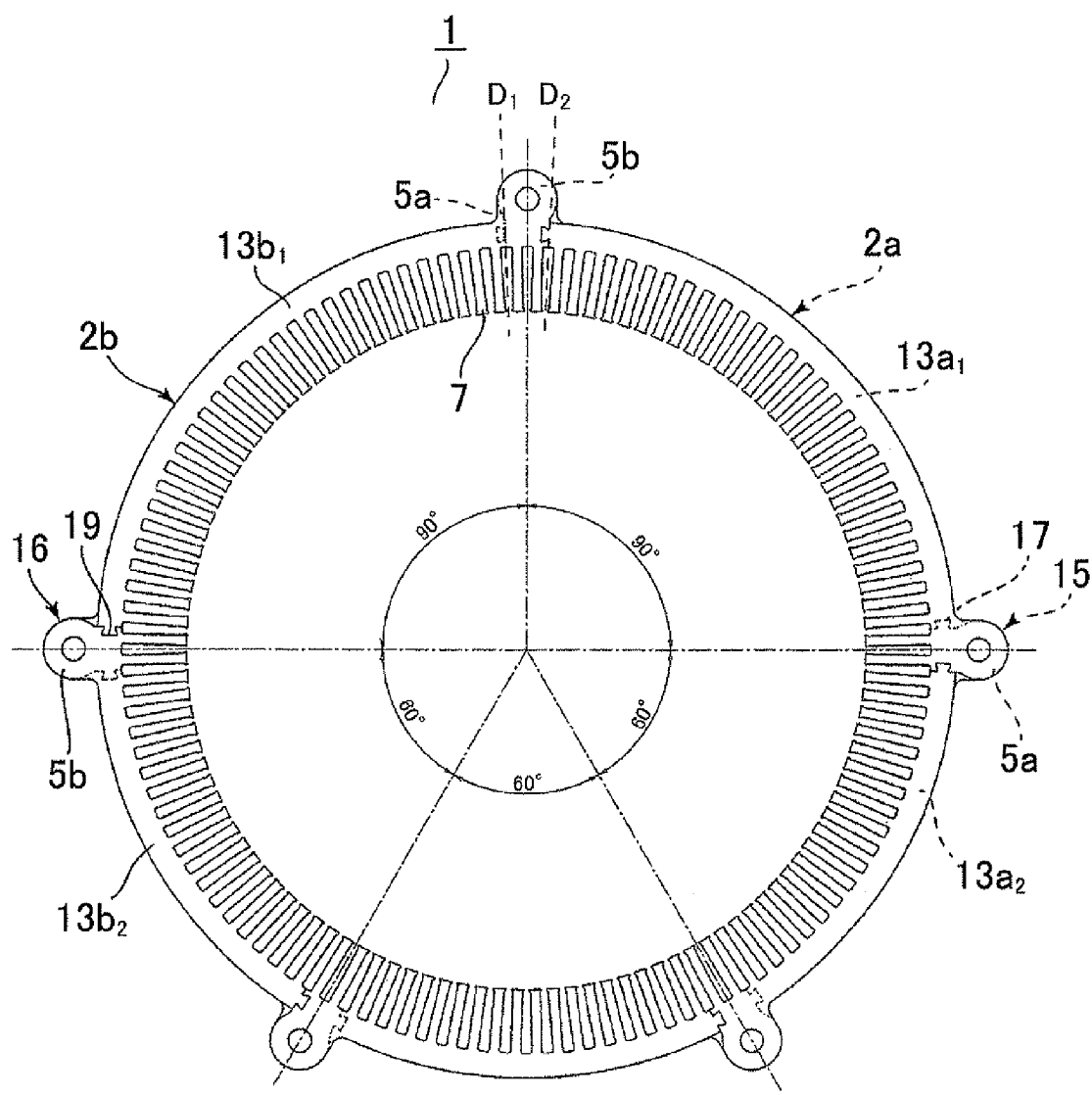
FIG. 5 is a schematic view of a stator core according to a second embodiment of the present invention.

As shown in FIG. 5, the stator core 1 is structured by laminating the annular first core plates 2a, structured by connecting the arc-shaped first core plate pieces (core plate pieces with the stator fixing portions closer to the first sides) 13a having the stator fixing portions 5a formed at the ends 15 with the projections 17, and the annular second core plates 2b, structured by connecting the arc-shaped second core plate pieces (core plate pieces with the stator fixing portions closer to the second sides) 13b having the stator fixing portions 5b formed at the ends 16 with the depressions 19, such that the stator fixing portions 5a and 5b thereof overlap with each other.

Each of the first core plates 2a has five stator fixing portions 5a on the outer circumference thereof, and these five stator fixing portions 5a are unevenly arranged so as to fit the shape of the transmission case 3 serving as a stator holding member. Specifically, four stator fixing portions 5a are formed on the outer circumference of the annular first core plate 2a at intervals of 60°, and one stator fixing portion 5a is formed so as to be remote from the adjacent stator fixing portions 5a by 90°.

Therefore, the first core plate 2a is unevenly divided such that each core plate piece 13a has one stator fixing portion 5a on the basis of the layout of the stator fixing portions 5a, and the first core plate pieces 13a include two different types of core plate pieces, that is, first short core plate pieces (core plate pieces with first stator fixing portions closer to the first sides) $13a_2$ whose arc is short and first long core plate pieces (core plate pieces with second stator fixing portions closer to the first sides) $13a_1$ whose arc is long.

That is, the annular first core plate 2a is structured by connecting the three first short core plate pieces $13a_2$ and the two first long core plate pieces $13a_1$ whose arc is longer than that of the first short core plate pieces $13a_2$ in the circumferential direction, and has line symmetry with respect to the stator fixing portion 5a of the first long core plate pieces $13a_1$ remote from the adjacent stator fixing portions 5a by 90°.

As are the first core plates 2a, each of the second core plates 2b includes four stator fixing portions 5b on the outer circumference thereof at intervals of 60° and one stator fixing portion 5b remote from the adjacent stator fixing portions 5b by 90°, and is unevenly divided on the basis of the layout of the stator fixing portions 5b.

That is, the second core plate pieces 13b include two different types of core plate pieces, that is, second short core plate pieces (core plate pieces with first stator fixing portions closer to the second sides) $13b_2$ whose arc is short and second long core plate pieces (core plate pieces with second stator fixing portions closer to the second sides) $13b_1$ whose arc is longer than that of the second short core plate pieces $13b_2$, and the annular second core plate 2b is structured by connecting the three second short core plate pieces $13b_2$ and the two second long core plate pieces $13b_1$ in the circumferential direction.

In this manner, the positions of the stator fixing portions 5a and 5b can be determined so as to meet the restrictions of the stator holding member to which the stator fixing portions 5a and 5b are fixed by unevenly dividing the core plates 2a and 2b such that the connecting positions (joints) $D_1$ and $D_2$ between the core plate pieces are not evenly arranged over the entire circumferences of the core plates 2a and 2h, respectively.

Even when the core plates 2a and 2b are unevenly divided as described above, the ring strength of the stator core equal to that obtained when the core plates 2a and 2b are evenly divided can be retained with the stator fixing portions 5a and 5h that are arranged so as to have symmetry, and thereby the types of the core plate pieces 13 can be reduced.

That is, the arc lengths of all the first core plate pieces 13a may be the same or may vary as far as the stator fixing portions 5a are closer to the first sides, and the arc lengths of the second core plate pieces 13b may be the same or may vary as far as the stator fixing portions 5h are closer to the second sides.

In this embodiment, the stator fixing portions 5a and 5b are formed at intervals of 90° in the halves (range of 180°) of the annular core plates 2a and 2h and at intervals of 60° in the other halves, for example, so that the positions of the stator fixing portions 5a and 5b have symmetry. Since the positions of the joints between the core plate pieces are located between the stator teeth 7, the number of the stator teeth 7 is also considered to determine the number of divisions of the core plates 2a and 2b.

In the first and second embodiments, the core plates 2 are laminated such that the first core plates 2a and the second core plate 2b are alternately laminated in this order. However, the core plates 2 may be laminated such that a second core plate 2b is laminated first as a matter of course or such that first assembly units including a plurality of first core plates 2a and second assembly units including a plurality of second core plates 2h are alternately laminated. That is, the stator core 1 may include a laminate of any predetermined number of first core plates 2a and any predetermined number of second core plates 2b that are alternately laminated.

Figure 6:
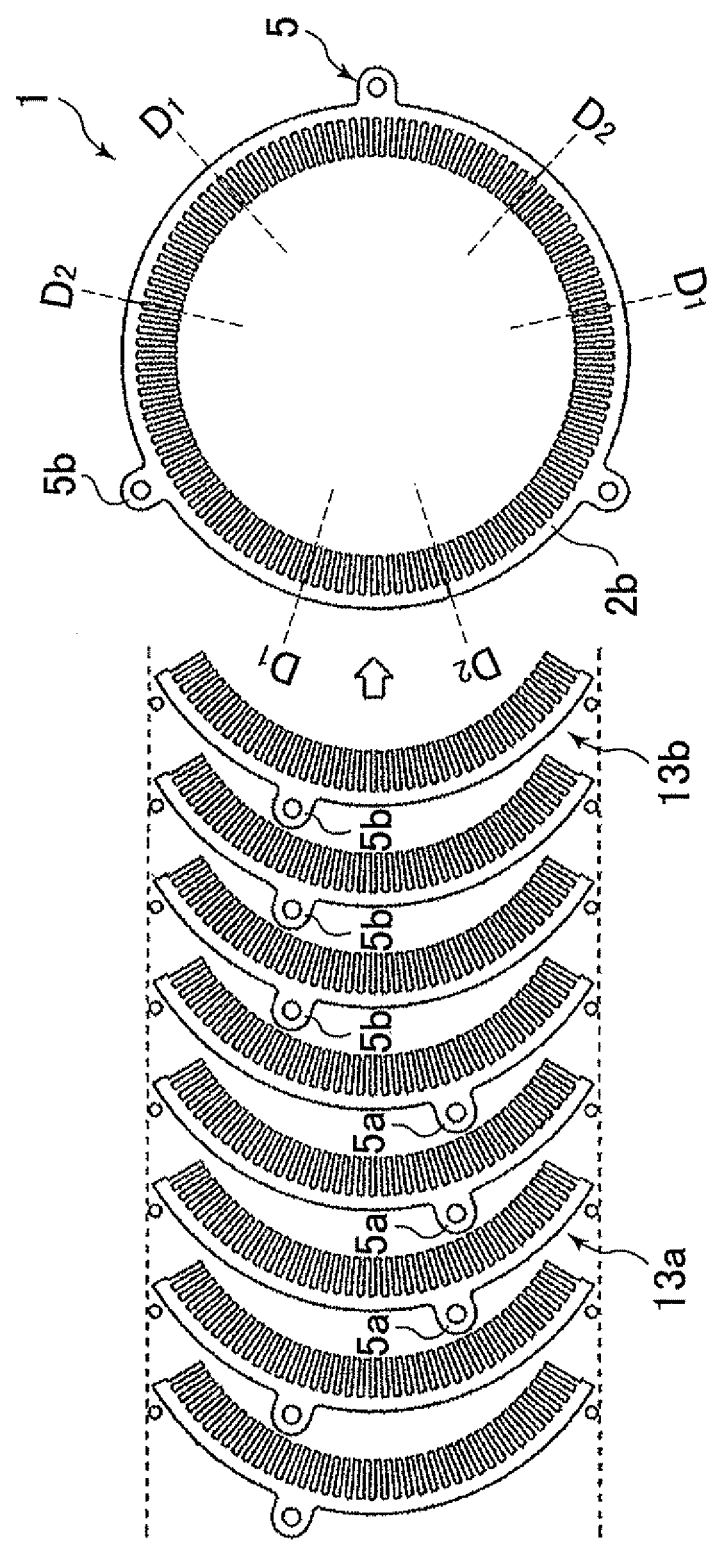
FIG. 6 illustrates a modification example in which stator fixing portions according to the embodiments of the present invention are not formed at ends of core plate pieces.

Although the stator fixing portions 5 of the core plate pieces 13 are disposed at positions as close to the ends 15 and 16 of the core plate pieces 13 as possible, the stator fixing portions 5 do not need to be located at the ends 15 and 16 of the core plate pieces 13 as far as the stator fixing portions 5 are shifted from the midpoints $C_1$ of the core plate pieces 13 to the ends and as far as the stator fixing portions 5a of the first core plate pieces 13a and the stator fixing portions 5b of the second core plate pieces 13b are on opposite sides of the virtual line A to each other as shown in FIG. 6. Furthermore, the stator fixing portions 5a of the first core plates 2a and the stator fixing portions 5b of the second core plates 2b do not necessarily need to be symmetric to each other with respect to the virtual line A.

Figure 7A:
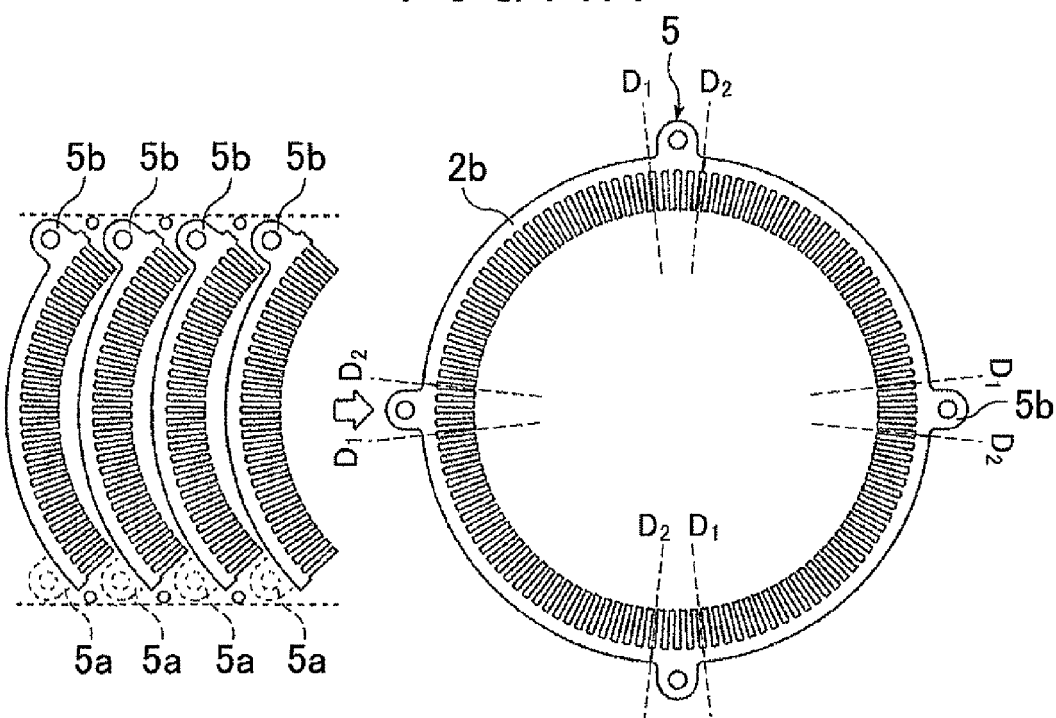
FIG. 7A illustrates a modification example in which a core plate according to the embodiments of the present invention is divided into four.
Figure 7B:
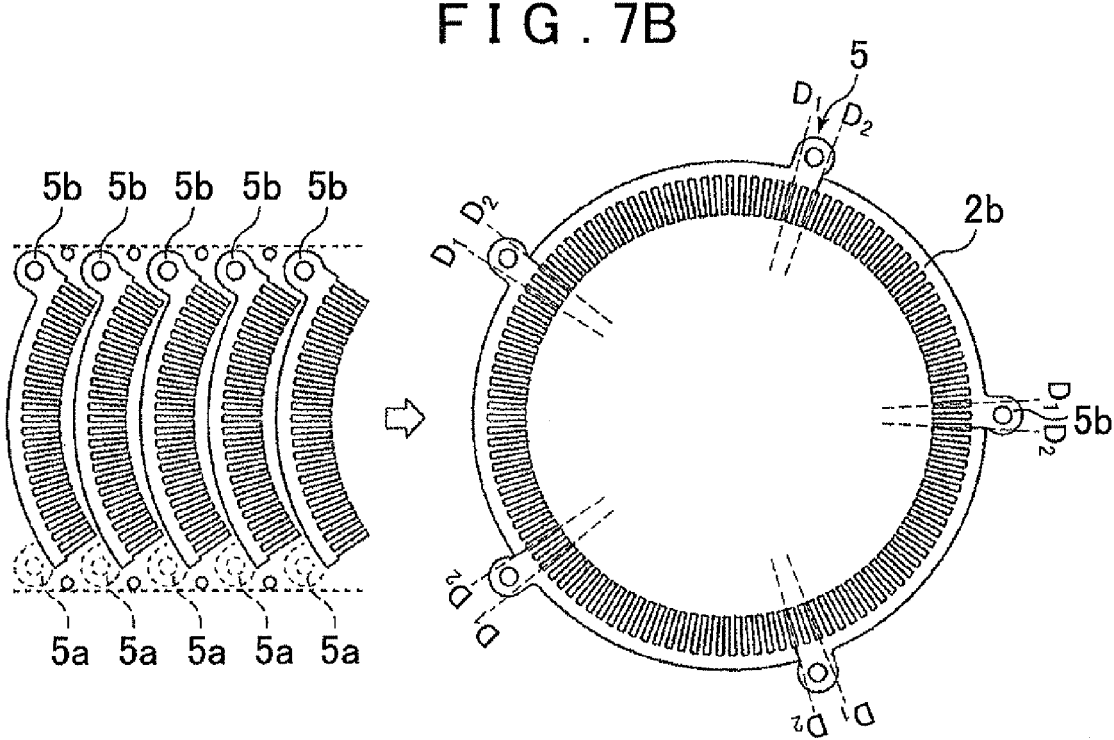
FIG. 7B illustrates a modification example in which a core plate according to the embodiments of the present invention is divided into five.

In the first and second embodiments, the core plates 2 that constitute the stator core 1 are divided into three. However, as shown in FIGS. 7A and 7B, the core plates 2 may be divided into four, five, or any number in accordance with the size of the stator core 1.

Furthermore, the invention described in the embodiments above is not limited to IPM motors, and may be applied to any rotating electrical machines. In addition, the inventions may be combined in any way.

The present invention relates to rotor cores of rotating electrical machines formed by laminating a plurality of core plates, and may be used in rotating electrical machines mounted on any products, for example, rotating electrical machines mounted on vehicles such as passenger vehicles, buses, and trucks as driving sources.

What is claimed is:

1. A stator core of a rotating electrical machine, comprising:
    an annular first core plate including a plurality of first core plate pieces, each of which is an arc-shaped member and has a stator fixing portion that is fixed to a stator holding member and protrudes from an outer circumference of the arc-shaped member at a position closer to a first side than to a midpoint of the outer circumference in a circumferential direction, the plurality of first core plate pieces being disposed in the circumferential direction to form the annular shape of the first core plate; and
    an annular second core plate including a plurality of second core plate pieces, each of which is an arc-shaped member and has a stator fixing portion that is fixed to the stator holding member and protrudes from an outer circumference of the arc-shaped member at a position closer to a second side than to a midpoint of the outer circumference in the circumferential direction, the plurality of second core plate pieces being disposed in the circumferential direction to form the annular shape of the second core plate, wherein
    a predetermined number of the first and second core plates are alternately laminated such that the stator fixing portions overlap with each other and such that positions of joints between the first core plate pieces of the first core plates differ from positions of joints between the second core plate pieces of the second core plates in the circumferential direction,
    the first and second core plates are structured by joining the plurality of first and second core plate pieces, respectively, at joint surfaces at both ends thereof in the circumferential direction,
    the stator fixing portion of each of the first core plate pieces is formed on the outer circumference entirely on an opposite side of a parallel line from a perpendicular line orthogonal to a tangent at the midpoint and passing through the midpoint, the outer circumference of each of the first core plate pieces being a continuous surface absent of a stator fixing portion on a perpendicular line side of the parallel line, the parallel line being parallel to the perpendicular line and passing through a corner of the joint surface on an inner circumferential side of the first core plate piece, the corner being a tip end of a stator tooth, and
    the stator fixing portion of each of the second core plate pieces is formed on the outer circumference entirely on an opposite side of a parallel line from a perpendicular line orthogonal to a tangent at the midpoint and passing through the midpoint, the outer circumference of each of the second core plate pieces being a continuous surface absent of a stator fixing portion on a perpendicular line side of the parallel line, the parallel line being parallel to the perpendicular line and passing through a corner of the joint surface on an inner circumferential side of the second core plate piece, the corner being a tip end of a stator tooth.

2. The stator core of a rotating electrical machine according to claim 1, wherein each of the first and second core plate pieces includes a protrusion protruding from a first side of a respective core plate and a recess formed on a second side opposite the first side at a position corresponding to a position of the protrusion, the protrusion and the recess being spaced a distance from the respective joint surfaces of the first and second core plate pieces, the protrusions and the recesses forming fastening portions which fasten together the first and second core plates, with the first and second core plates laminated adjacent to each other.

\* \* \* \* \*